US007416999B2

(12) United States Patent
Arnold et al.

(10) Patent No.: US 7,416,999 B2
(45) Date of Patent: Aug. 26, 2008

(54) NET CONTAINING VISIBLE LETTERING AND METHOD FOR APPLYING VISIBLE LETTERING TO NETS

(76) Inventors: Uwe Arnold, Ostring 136, D67069 Ludwigshafen (DE); Freddy Arnold, Ostring 36, D-67069 Ludwigshafen (DE)

( * ) Notice: Subject to any disclaimer, the term of this patent is extended or adjusted under 35 U.S.C. 154(b) by 154 days.

(21) Appl. No.: 11/294,818

(22) Filed: Dec. 6, 2005

(65) Prior Publication Data

US 2006/0128238 A1 Jun. 15, 2006

Related U.S. Application Data

(63) Continuation of application No. PCT/EP2004/006051, filed on Jun. 4, 2004.

(60) Provisional application No. 60/479,030, filed on Jun. 17, 2003.

(30) Foreign Application Priority Data

Jun. 6, 2003 (DE) ................................ 103 26 112
Aug. 22, 2004 (DE) ................................ 203 13 118

(51) Int. Cl.
*G09F 17/00* (2006.01)
*B05D 1/12* (2006.01)
*B05D 1/14* (2006.01)
*B05D 1/16* (2006.01)
*B32B 5/02* (2006.01)

(52) U.S. Cl. ............................ 442/43; 442/58; 428/90; 428/195.1; 428/199; 428/200; 428/206; 428/207; 40/603; 40/604

(58) Field of Classification Search .................. 428/90, 428/195.1–210; 442/43, 58; 40/584–604
See application file for complete search history.

(56) References Cited

U.S. PATENT DOCUMENTS 3,782,724 A * 1/1974 Rottman et al. ............. 267/140
5,307,578 A * 5/1994 Fichtenau .................... 40/584
6,810,632 B2 * 11/2004 Ringness ..................... 52/314
2002/0092218 A1 7/2002 Black

FOREIGN PATENT DOCUMENTS

GB 2 323 390 A 9/1998
JP 5 339858 A 12/1993
JP 06-145562 * 5/1994

* cited by examiner

*Primary Examiner*—N L Torres-Velazquez
*Assistant Examiner*—Matthew D Matzek
(74) *Attorney, Agent, or Firm*—Laurence A. Greenberg; Werner H. Stemer; Ralph E. Locher

(57) ABSTRACT

A net, in particular a ball net for catching balls, such as a volleyball net, football net, tennis net or ball-catching net, or a net-like fence, has a net body formed from net threads connected to one another in mesh form. The net is distinguished in that the net. threads of the net body are thickened, in one region, over a plurality of meshes by an applied thickening material, in such a way that the region can be recognized by the observer outwardly, with high visual contrast, as a character, in particular as a letter character or logo.

39 Claims, 1 Drawing Sheet

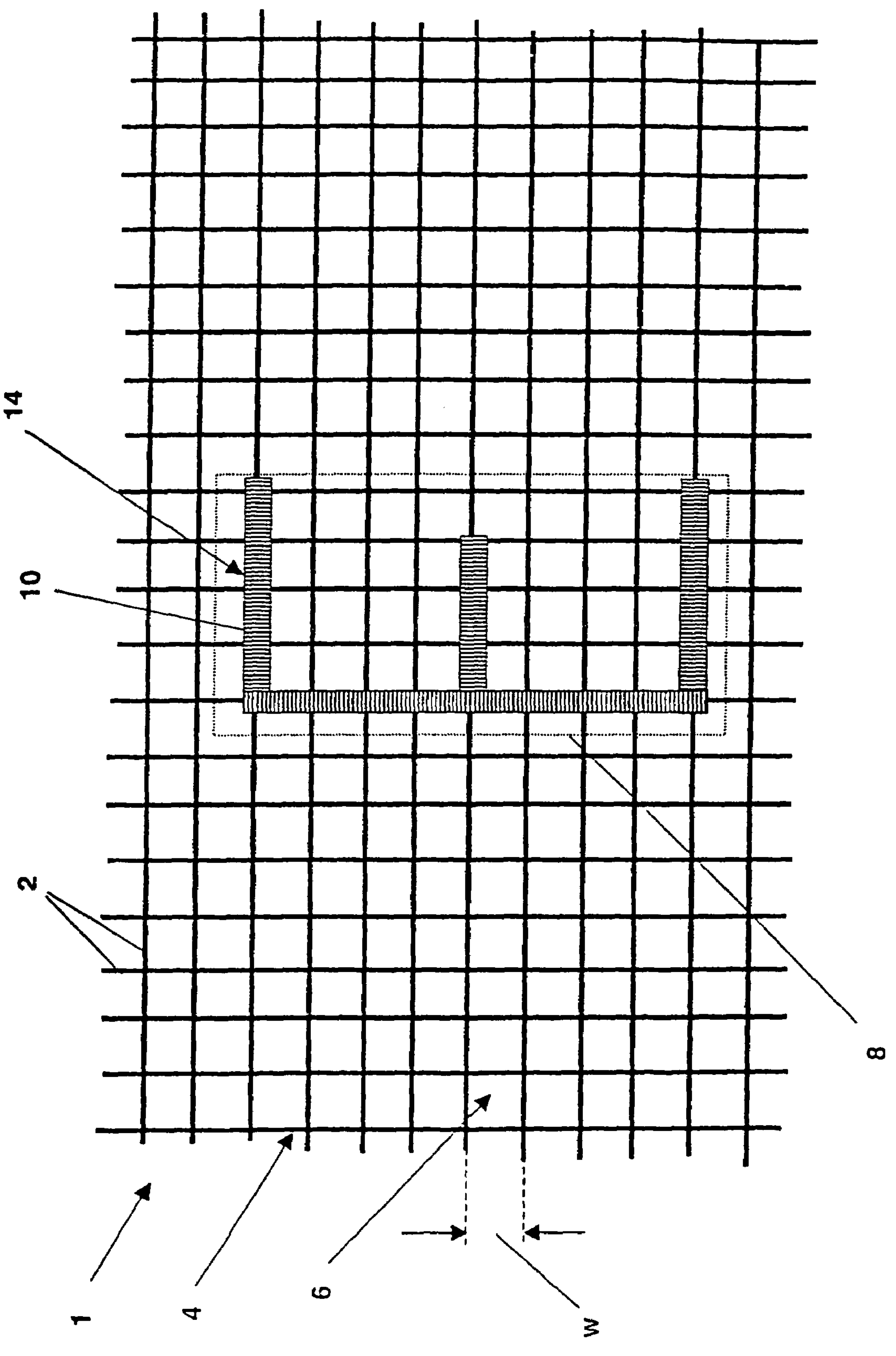
14
10
2
8
1
4
6
w

NET CONTAINING VISIBLE LETTERING AND METHOD FOR APPLYING VISIBLE LETTERING TO NETS

CROSS-REFERENCE TO THE RELATED APPLICATIONS

This is a continuing application, under 35 U.S.C. §120, of copending international application No. PCT/EP2004/006051, filed Jun. 4, 2004, which designated the United States; this application also claims the priority, under 35 U.S.C. §119, of German patent application Nos. DE 103 26 112.5, filed Jun. 6, 2003; and DE 203 13 118.5 filed Aug. 22, 2004; this application also claims the priority, under 35 U.S.C. §119(e) of U.S. provisional patent application No. 60/479,030, the prior applications are herewith incorporated by reference in their entirety.

BACKGROUND OF THE INVENTION

Field of the Invention

The invention relates to a net, in particular a volleyball net, football net, tennis net, or a net-like fence, having visible lettering, and to a method for applying visible lettering to nets. The net has a net body formed from net threads connected to one another in mesh form. The net body has meshes with a mesh width which ensures a substantially unrestricted view through the net body.

In nets for the sporting sector, in particular ball nets, such as tennis nets or volleyball nets, or else nets for football goalmouths, or guard fences, which may potentially serve as advertising carriers, there is the problem that a partial coloring of the net threads, which are comparatively thin in relation to the mesh width used and of which the nets are formed, is not detected or is detected only very poorly in visual terms.

Moreover, there is the difficulty that the material, in particular polyester or polyamide, from which the net threads are produced, is not absorbent and has a surface quality such that the printing inks or spray paints normally used for the printing of articles adhere to them only very poorly.

SUMMARY OF THE INVENTION

It is accordingly an object of the invention to provide a net containing visible lettering and a method for applying visible lettering to nets which overcome the above-mentioned disadvantages of the prior art devices and methods of this general type, which has visible lettering that can easily be recognized permanently by an observer and is efficiently produced.

According to the invention, a net, in particular a ball net for catching balls, such as a volleyball net, football net, tennis net or ball-catching net, or a net-like fence, having a net body formed from net threads connected to one another in mesh form, is distinguished in that the net threads of the net body are thickened, in one region, over a plurality of meshes by an applied thickening material, in such a way that the region can be recognized by the observer outwardly, with high visual contrast, as a character, in particular as a letter character or logo.

As a result, particularly in the case of nets for sporting use, formed from polyamide, nylon, perlon, polyethylene or polyester material, with a diameter of the net threads of, for example, 0.5 to 10 mm and a mesh width in the range of, for example, 4.5 cm, a three-dimensional visual impression is obtained which brings out particularly attractively to the viewer the logos and the numbers and letters to be displayed, and which also leads to clearly visible images when pictures are taken by television cameras. On the other hand, in the case of mesh widths of, as a rule, at least 18 mm (badminton nets), normally used for catching balls in the case of sporting nets, the applied thickening material still ensures that the players or onlookers can see through the nets in such a way that there are no visual impediments for the sportspeople/onlookers in question.

In the preferred embodiment of the invention, the thickening of the net threads is advantageously produced by flocculating the net threads with a thickening material, thus making it possible to achieve a particularly permanent coating even on flexible nets formed from plastics which, as a rule, cannot be wetted or can be wetted only very poorly with paint.

For this purpose, flocculating devices generally known from the prior art may be used, such as are employed, for example, for the production of velvet-like structures in automobile construction or on articles of clothing.

According to the invention, for the flocculating operation, the net or the net-like article is disposed between a first and a second stencil which is provided in each case with an orifice corresponding to the character form, for example a wooden stencil having a recess which possesses the form of a letter.

The flocculation of the net threads with the thickening material then takes place preferably, at least once, from the side of the net and, a second time, from the opposite side of the net which is tension-mounted between the two stencils, so that a plurality of layers of liquid adhesive and thickening material are successively applied alternately to the net threads to be thickened.

As the applicants found, in terms of good adhesive capacity, accumulation and uniform distribution of the thickening material on the net threads, it is advantageous if the application of the various layers of adhesive and of thickening material takes place successively, alternately from one side and from the other side, by the wet-on-wet method.

Furthermore, it has in this case proved to be advantageous if, in nets in which a plurality of characters are arranged over the width of the net, each character is first ready-coated separately in a plurality of layers, preferably three layers, before the coating of the next character commences.

In order to obtain a particularly homogeneous coating which is efficient in terms of material consumption, the application of the thickening material advantageously takes place using electrostatic charges.

For this purpose, the coating material or thickening material is, for example, charged positively and is accelerated by a counter electrode arranged on the opposite side of the net. In the case of a fiber material, the thickening material follows the field lines of the electrostatic field, and only the tips of the fiber material penetrate into the adhesive layer previously applied to the net threads and bonding with the net threads. Subsequently, the rear side of the net threads, which in this case is, as a rule, still unflocculated, is flocculated in the same way after the net is reversed, and in this case, using a fiber material with a different color, lettering or a logo can advantageously be applied to both sides of the net in the correct presentation, without an adverse mirror-symmetrical presentation being obtained.

In this respect, there may be provision, furthermore, for making the net threads electrically conductive by use of woven-in metal wires and for using them as a counter electrode, thus resulting in a virtually uniform radially symmetrical distribution of the flocked-on fibers around the net threads. As a result, in addition to a highly uniform structure of the flocculating material, there is the advantage, particularly in the case of mirror-symmetrical logos or letters, that, in order to produce a display which is visible on both sides, flocculation needs to be carried out from only one side of the net.

According to the preferred embodiment of the invention, the adhesive, which, for example, may be a commercially obtainable two-component liquid adhesive for plastics which is coordinated with the material of the net, for example an epoxy resin or else a cyanate adhesive or another suitable adhesive, is colored in the color of the character to be produced, thus resulting in a high degree of color fidelity, and, when the adhesive is sprayed onto a net having dark net threads, the complete wetting of the net threads just sprayed can very easily be checked visually.

In order to obtain a visually particularly emphatic effect, the thickening material preferably has a color different from that of the net threads, and this may take place, for example, by the coloring of the thickening material. Coloring may in this case also take place advantageously, using a fluorescent paint, as a result of which, particularly in darkness, impressive visual lighting effects can be produced when the corresponding regions of the net are radiated with UV light or black light.

The thickening material is preferably a fiber material which possesses a fiber length in the range of between 0.2 mm and 4 mm, in particular between 0.5 mm and 1.0 mm.

In this case, according to a further embodiment of the idea on which the invention is based, a mixture of fiber material of different lengths may be advantageous. Thus, for example, in practice, by flocculation with a mixture of fiber material with a length of 0.5 mm and 1 mm, a clearly detectable intensification of the visual color impression and also the contrast in relation to the net threads or in relation to the background against which the net is arranged could be achieved.

In the same way, however, there is the possibility of flocking on fiber material with a length of, for example, 1 mm in a first pass and fiber material with a length of, for example, 0.5 mm in a second pass, as a result of which, particularly in the case of larger surfaces, the interspaces between the longer fibers are filled up, thus increasing the density of the fiber material on the surface of the net threads and consequently the color intensity.

The length of the fiber material used is preferably selected as a function of the thread thickness or thread diameter of the net threads, and it was shown that visually particularly attractive characters are obtained when the ratio of thread thickness to flock length is in the range between 0.2 and 50, in particular 2.5 and 8.

Particularly suitable materials are in this case rayon and polyester, although the use of cotton or another substance, such as, for example colored plastic powder, is likewise possible.

As the applicants found, particularly advantageous flocculation can in this case be achieved by a fiber material which possesses a fineness in the range of between 3 DTex and 10 DTex.

According to a further embodiment of the invention, the thickening of the net threads may take place by spraying on a colored self-expanding plastic material and curing the latter, for example by irradiation with UV light. The plastic material is in this case preferably a self-expanding plastic material which has already been used for a long time for articles of clothing and which is conventionally printed on by the screen-printing method to produce a three-dimensional structure on caps, T-shirts and jackets, etc.

Although the ratio of the character size, that is to say the length and/or width of a character, may basically be lower than the mesh width, the ratio of character size to mesh width is in the range higher than 1:3, in the case of the nets described above an especially conspicuous visual effect being obtained particularly when the ratio of character size to mesh width of the nets is in the range of between 8:1 and 20:1, in particular in the range of between 10:1 and 16:1.

Thus, where volleyball nets are concerned, in the case of a mesh width of approximately 4.5 cm, the characters have particularly preferably a size of 70 cm, thus corresponding to a ratio of 15.5:1.

However, the ratio of character size and mesh width may even be higher, and, for example in the case of very large ball-catching nets possessing a height of several meters, may be in the region of 150:1.

In the preferred embodiment of the invention, the thickness of the layer of thickening material applied by flocculation to the net threads with the aid of electrostatics is preferably in the range of between 10% and 600% of the thickness of the original net threads, depending on the mesh width of the net. Thus, it was shown, in practice, that, for example in the case of volleyball nets with a net thread thickness of approximately 3.2 mm, a layer of fiber-like thickening material having a thickness of approximately 4 mm and applied on both sides by flocculation leads to a visually very attractive effect which ensures a very good visibility of the applied lettering, even in the case of an oblique viewing angle. In this embodiment of the invention, in which the thickness of the applied coating material amounts overall to approximately 117% of the thickness of the original net threads, a high flexibility of the net threads and very high resistance of the thickening material to mechanical erosion are obtained.

According to a further embodiment of the invention, which makes it possible to produce the nets according to the invention particularly simply and cost-effectively, the net body is thickened, in the region of the character or characters or logo or logos to be applied, with, in particular, white thickening material, preferably fiber material, and thereafter, one or more characters are produced by coloring the thickening material on the net body. For this purpose, according to a preferred embodiment of the invention, the applied thickening material is produced by a stencil adapted to the form of the characters to be produced, preferably by paint being sprayed onto the preferably white thickening material, thus, in particular, also affording the possibility of applying a plurality of different colors in the shortest possible time. The production of multicolor characters or logos can thereby be simplified considerably and the time required for this purpose reduced by a multiple.

Other features which are considered as characteristic for the invention are set forth in the appended claims.

Although the invention is illustrated and described herein as embodied in a net containing visible lettering and a method for applying visible lettering to nets, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The single FIGURE of the drawing is a diagrammatic, illustration of a net according to the invention.

DESCRIPTION OF THE PREFERRED EMBODIMENTS

Referring now to the single FIGURE of the drawing in detail, there is shown a net 1 according to the invention which includes a net body 4 formed from net threads 2 connected to one another in mesh form. Meshes 6 of the net body 4 have a mesh width W of at least 18 mm which enables a user of the net 1, for example a sportsperson, to have a substantially unrestricted view through the net body 4.

As also shown in the figure, the net threads 2 of the net body 4 are thickened, in a region 8 indicated by a broken line, over a plurality of meshes 6 by a thickening material 10 applied to the net threads 2 with the aid of electrostatic charges, in such a way that the region 8 projects outward as a character 14, in particular as a letter character or logo, which is contrasted from the net body 4. In this case, the diameter, that is to say the thickness, of the net threads 2 thickened by the thickening material 10 is, according to the invention, considerably smaller in the region 8 than the mesh width W, in order, in the same way as in the uncoated regions of the net body 4, also to ensure a free view through the meshes 6 in the coated region 8. The thickness of the layer of thickening material 10 applied to the net threads 2 is preferably in the range of between 10% and 600% of the diameter of the uncoated net threads 2, depending on the net and mesh width.

We claim:

1. A net, comprising:

a net body formed from net threads connected to one another in mesh form, said net body defining meshes with a mesh width ensuring a substantially unrestricted view through said net body, said net threads being thickened, in a region, over a plurality of said meshes by a thickening material in a form of a fiber material applied by flocculation, such that said region being recognized outwardly as a character being contrasted from said net body.

2. The net according to claim 1, wherein said thickening material is applied to said net threads from both sides of said net body.

3. The net according to claim 1, further comprising an adhesive, and a layer of said adhesive and a layer of said thickening material being applied alternately to said net threads.

4. The net according to claim 1, wherein said net threads are electrically conductive.

5. The net according to claim 3, wherein said adhesive is colored in a color corresponding substantially to a color of said thickening material.

6. The net according to claim 1, wherein said thickening material possesses a different color from that of said net threads and/or is fluorescent.

7. The net according to claim 1, wherein:

said net body has a first side and is provided on said first side with said thickening material of a first color; and said net body has a second side, being opposite said first side, and said thickening material disposed on said second side having a second color different from said first color.

8. The net according to claim 1, wherein said fiber material has a fiber length in a range of between 0.2 mm and 4 mm.

9. The net according to claim 8, wherein said thickening material has a mixture of fibers of a first and a second fiber length.

10. The net according to claim 1, wherein said thickening material is formed of at least one material selected from the group consisting of rayon, polyester and cotton.

11. The net according to claim 1, wherein said thickening material possesses a fineness in a range of between 0.9 DTex and 44 Dtex.

12. The net according to claim 1, wherein a ratio of a size of said character produced to said mesh width is in a range higher than 3:1.

13. The net according to claim 1, wherein a thickness of said thickening material applied to said net threads is in a range between 10% and 600% of a thickness of said net threads.

14. The net according to claim 1, wherein a ratio of a thickness of said net threads to a length of fibers of said fiber material is in a range of between 0.2 and 50.

15. The net according to claim 1, wherein said character is a letter character or a logo.

16. The net according to claim 1, wherein said net body forms a volleyball net, a football net, a tennis net, or a badminton net.

17. The net according to claim 8, wherein said fiber length is in a range of between 0.5 mm and 1.0 mm.

18. The net according to claim 9, wherein said first and second fiber lengths are 0.5 mm and 1.00 mm, respectively.

19. The net according to claim 11, wherein said fineness is in a range of between 3 DTex and 10 Dtex.

20. The net according to claim 12, wherein said ratio of said size of said character produced to said mesh width is in a range of between 8:1 and 20:1.

21. The net according to claim 14, wherein said thickness of said net threads to said length of said fibers of said fiber material is in a range of between 2.5 and 8.

22. A method for producing visible characters on a net-type article having a net body formed from net threads connected to one another in mesh form with a mesh width ensuring a substantially unrestricted view through the net body, which comprises the steps of:

thickening the net threads of the net body, in one region, over a plurality off meshes using a thickening material in a form of a fiber material applied by flocculation applied by spraying, such that the region can be recognized outwardly as a character being contrasted from the net body.

23. The method according to claim 22, which further comprises disposing the net, for flocculation, between a first and a second stencil each having in each case an orifice formed therein corresponding to a form of the character.

24. The method according to claim 23, which further comprises performing the flocculation of the net threads with the thickening material on both sides of the net.

25. The method according to claim 22, which further comprises applying a plurality of layers of liquid adhesive and the thickening material successively and alternately to the net threads to be thickened.

26. The method according to claim 25, which further comprises using a wet-on-wet method directly and successively for applying the layers of the liquid adhesive and the thickening material.

27. The method according to claim 25, which further comprises: disposing a plurality of the characters over a width of the net, each region of the net assigned to a respective character, first being coated separately with at least two layers of the liquid adhesive and the thickening material before a coating of a next region.

28. The method according to claim 25, which further comprises applying three layers of the liquid adhesive and the thickening material.

29. The method according to claim 22, which further comprises applying the thickening material using electrostatic charges.

30. The method according to claim 29, which further comprises:

using electrically conductive net threads as the net threads; and applying the thickening material by acting upon the electrically conductive net threads with an opposite electrostatic charge with respect to the thickening material.

31. The method according to claim 22, which further comprises forming the fiber material with a fiber length in a range of between 0.2 mm and 1.5 mm.

32. The method according to claim 22, which further comprises forming the thickening material with at least one material selected from the group consisting of rayon, polyester and cotton.

33. The method according to claim 31, which further comprises forming the thickening material with a fineness in a range of between 3 DTex and 44 DTex.

34. The method according to claim 22, which further comprises forming the thickening material with fibers of a first and second fiber length.

35. The method according to claim 22, which further comprises:

thickening the net body, in the region, with the thickening material being, a white thickening material; and subsequently producing at least one character by coloring the white thickening material on the net body.

36. The method according to claim 35, which further comprises coloring the white thickening material by spraying paint onto the white thickening material.

37. The method according to claim 22, which further comprises selecting the net-type article from the group consisting of a volleyball net, a football net, a tennis net, and a net-type fence.

38. The method according to claim 22, which further comprises forming the character as a letter character or a logo.

39. The method according to claim 22, which further comprises forming the fiber material with a fiber length in a range of between 0.5 mm and 1.0 mm.

* * * * *